March 19, 1935.  F. BARFOD  1,994,805
UNIVERSAL CONNECTION
Filed Jan. 12, 1933
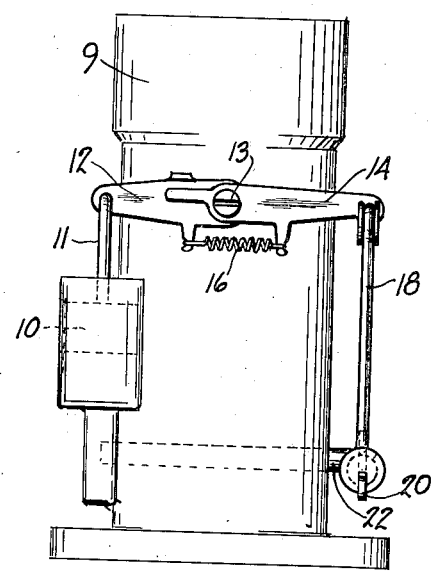
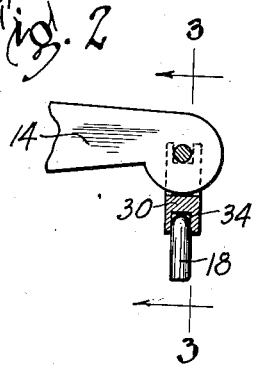
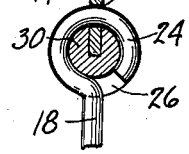
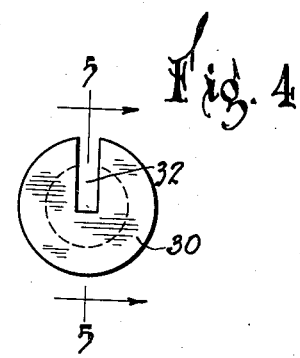
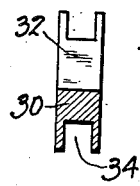
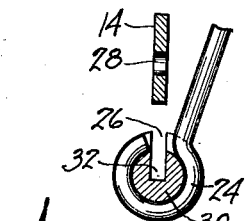
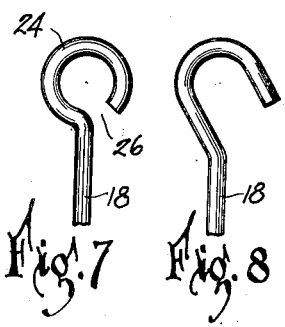
INVENTOR.
Frederik Barfod
BY
ATTORNEY Patented Mar. 19, 1935

1,994,805

UNITED STATES PATENT OFFICE 1,994,805

UNIVERSAL CONNECTION

Frederik Barfod, South Bend, Ind., assignor to Bendix Aviation Corporation, South Bend, Ind., a corporation of Delaware Application January 12, 1933, Serial No. 651,396

4 Claims. (Cl. 287—92)

This invention relates to universal connections for joining two members adapted to move in planes that are not parallel and has for its principal object the provision of a connection of simple design and inexpensive construction.

In automotive construction it has been common practice to use ball and socket connections for joining carburetor control rods to levers where the rods and levers do not move in the same plane or in planes that are parallel to each other. The present invention provides a universal connection, suitable for connecting carburetor control rods and levers, and for similar uses, which is of simple construction and can be readily connected and disconnected as required. When installed the connection of this invention securely joins the two members together but does not hamper their movement, each in its own plane.

The invention will be best understood from the detailed description and claims which follow reference being had to the accompanying drawing in which a preferred embodiment is shown by way of example and in which:

Figure 1 is a fragmentary view of a carburetor control showing the use of the connection;

Figure 2 is an enlarged fragmentary view showing the connection of the control rod to the lever;

Figure 3 is a cross sectional view taken along the line 3—3 of Figure 2 looking in the direction of the arrows;

Figure 4 is an elevational view of the connecting member;

Figure 5 is a cross sectional view along the line 5—5 of Figure 4 looking in the direction of the arrows;

Figure 6 is an exploded view, partly in section, showing the manner of assembling the connection;

Figure 7 is a plan view showing the hook on the end of the rod; and

Figure 8 is a plan view of a modified form of hook.

Referring now to the drawing in more detail, I have shown by way of example, a carburetor 9 having a connection between an accelerating pump lever and rod made with the connection of my invention. In Figure 1 the accelerating pump piston 10 is connected to pivoted lever 12 by a suitable rod 11. Lever 14 floats on the pivotal axis 13 of lever 12 and is connected to lever 12 by a spring 16. Rod 18 is connected to the free end of lever 14 and to a lever 20 fixed upon the throttle shaft 22. It will be noted that the throttle shaft axis is at right angles to the axis of pivot 13. In the operation of the device when the shaft 22 is rotated to open the throttle, lever 20 is rotated to raise rod 18, which in turn rotates lever 14 on pivot 13. Spring 16 is tensioned and pulls lever 12 to lower piston 10 and thereby pump a charge of fuel into the mixing chamber of the carburetor.

The connection between rod 18 and lever 14 is shown in detail in Figures 2-5. Rod 18 is provided with a circular hooklike end 24 which is open at 26 sufficiently to permit lever 14 to pass through it so that the rod may be threaded through an opening 28 in the lever. Spool-like member 30 is slotted at 32 to receive lever 14 and is provided with a circumferential groove 34 which receives the hook 24 in rotatable relation. To assemble the connection the spool is turned in the hook 24 to align slot 32 with the open end or slot 26 of the hook. The rod is then turned upwardly of lever 14, as shown in Figure 6, and the lever is inserted in the registering slots. Rod 18 is then turned downwardly to thread the end of the hook through the opening 28, spool 30 being held against rotation meanwhile by the engagement of the edges of slot 32 with the sides of the lever. In operation the parts are positioned as shown in Figures 2 and 3. When the rod is moved in the plane of lever 14 it fulcrums on the hook and edges of opening 28 for rotation around the axis of that opening. When the rod is moved in a plane normal to the plane of the lever the hook 24 slides in the groove 34 and rotation is around the axis of spool 30. The rod may be swung through a wide angle without danger of uncoupling the connection and free movement of the rod in all directions is achieved. The connection may be uncoupled only by moving one of the coupled parts out of its normal range of movement, as by disconnecting lever 14 from shaft 13 or rod 18 from shaft 22.

With the connection of my invention it is not necessary to completely close the hook on the end of the rod. In fact the hook may be U-shaped, as shown in Figure 8, without danger of the connection uncoupling in service. The connection may be put to a variety of uses where the amount of power to be transmitted is small and in line with the requirements of the use shown in the example. The specific coupling shown may be modified within the teachings of the invention and I am not to be limited by the specific details of the example.

What is claimed is:

1. A connection for coupling a rod to a perforated lever for universal movement with respect thereto comprising, a circular hook on the rod passing through the perforation in the lever and rotatable about the axis thereof to permit movement of the rod in the plane of the lever, said hook being formed with a slot, and a spool fitted over the lever and containing a circumferential groove in which the hook rests and slides to permit movement of the rod in a plane normal to the lever, said spool being formed with a slot positioned to register with the slot in the hook only when the rod is moved beyond its normal range of movement.

2. A universal connection for coupling a rod to a perforated lever comprising, a hook on the rod threaded through the perforation in the lever to connect the rod thereto for swinging movement in the plane of the lever, and a spool containing a rectangular slot into which the lever fits and having a circumferential groove into which the hook fits and slides to permit the rod to swing in a plane normal to the lever.

3. A connection for coupling a rod to a perforated lever for universal movement with respect thereto comprising, a circular hook formed on the end of the rod and having a slot adjacent to the rod for receiving the lever, and a spool having a radial slot for receiving the lever and a circumferential groove for receiving the hook, said groove permitting the rod to be turned around the axis of the spool to thread the hook through the perforation in the lever to attach the rod to the lever.

4. A coupling for joining a rod and a lever comprising, a spool having a slot into which the lever fits and having a circumferential groove, there being a perforation in the lever registering with the groove, and a U-shaped hook on the rod disposed in the groove and extending through the perforation.

FREDERIK BARFOD.